(12) United States Patent
Matsumoto et al.

(10) Patent No.: US 12,061,501 B2
(45) Date of Patent: Aug. 13, 2024

(54) ELECTRONIC DEVICE, USER CONTROL METHOD, NON-TRANSITORY COMPUTER READABLE RECORDING MEDIUM

(71) Applicant: JVCKENWOOD Corporation, Yokohama (JP)

(72) Inventors: Masaki Matsumoto, Yokohama (JP); Morihiro Satoh, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 696 days.

(21) Appl. No.: 17/186,247

(22) Filed: Feb. 26, 2021

(65) Prior Publication Data

US 2021/0181813 A1  Jun. 17, 2021

Related U.S. Application Data

(63) Continuation of application No. PCT/JP2019/028628, filed on Jul. 22, 2019.

(30) Foreign Application Priority Data

Aug. 30, 2018 (JP) .................................. 2018-161146

(51) Int. Cl.
*G06F 1/18* (2006.01)
*G06F 1/16* (2006.01)

(52) U.S. Cl.
CPC ............ *G06F 1/185* (2013.01); *G06F 1/1694* (2013.01); *B60R 2300/302* (2013.01); *B60R 2300/404* (2013.01); *B60R 2300/70* (2013.01)

(58) Field of Classification Search
CPC ......... G06F 1/185; G06F 1/1694; B60R 1/00; B60R 2300/302; B60R 2300/404; B60R 2300/70
See application file for complete search history.

(56) References Cited

U.S. PATENT DOCUMENTS

| | | | |
|---|---|---|---|
| 9,811,800 B1 * | 11/2017 | Patel | G06Q 10/087 |
| 2013/0096771 A1 | 4/2013 | Srenger | |
| 2016/0359826 A1 * | 12/2016 | Clark | H04L 63/0807 |
| 2018/0059913 A1 | 3/2018 | Penilla et al. | |

FOREIGN PATENT DOCUMENTS

| | | |
|---|---|---|
| JP | 2012-128053 A | 7/2012 |
| JP | 2014-159120 A | 9/2014 |

OTHER PUBLICATIONS

Extended European Search Report from corresponding European Patent Application No. 19856053.4 mailed Oct. 11, 2021, 9 pages.

(Continued)

*Primary Examiner* — Mishawn N. Hunter
(74) *Attorney, Agent, or Firm* — Shih IP Law Group, PLLC (57) ABSTRACT

A first user control interface receives an input. A controller executes control determined by an input via the first user control interface. A housing is capable of housing a recording medium. An acquisition interface acquires housing information related to whether the recording medium is housed in the housing. The controller disenables the input via the first user control interface when the housing information acquired by the acquisition interface indicates that the recording medium is housed.

9 Claims, 7 Drawing Sheets

(56) References Cited

OTHER PUBLICATIONS

Darl Kuhn., "Motion Detection In Patient Monitors To Control Touch Screen Operations and Enhanced Alarm Notifications ED." IP.com Inc., West Henrientta, NY, US Apr. 22, 2010, XP013137932, ISSN:1553-0001, 7 pages.

International Preliminary Report on Patentability from International Application No. PCT/JP2019/028628 mailed Mar. 2, 2021, 11 pages.

International Search Report from International Application No. PCT/JP2019/028628 mailed Sep. 10, 2019, 4 pages.

\* cited by examiner

ELECTRONIC DEVICE, USER CONTROL METHOD, NON-TRANSITORY COMPUTER READABLE RECORDING MEDIUM

CROSS-REFERENCE TO RELATED APPLICATION

This application is based upon and claims the benefit of priority from the prior Japanese Patent Application No. 2018-161146, filed on Aug. 30, 2018, the entire contents of which is incorporated herein by reference.

BACKGROUND

1. Field

The present invention relates to a user control technology and, more particularly, to an electronic device, a user control method, and a non-transitory computer readable recording medium.

2. Description of the Related Art

There are cases in which it is desired to prohibit a third party from using a device that accesses a recording medium. In one approach to achieve this, user operation via a user operation input interface is disenabled after a predetermined time has elapsed since the information recorded in the recording medium is started to be read (see, for example, patent document 1).
[Patent Literature 1] JP2012-128053

Access to a recording medium is made in electronic devices such as drive recorders as well. In a vehicle without an independent trunk, a drive recorder for taking images of a scene behind the driver's vehicle is generally provided on a rear gate glass that faces a luggage storage space. Depending on the way the luggage is placed in the luggage storage space, the device setting button may be pressed by the luggage while the electronic device is in operation. When the button is pressed, the electronic device may be shifted to an operation mode other than the recording mode. For example, the electronic device may be shifted to a device setting mode. When the electronic device is shifted to a device setting mode, troubles such as suspension of recording, change in the recording-related setting, and failure to record images as desired may occur.

SUMMARY

An electronic device according to an embodiment includes: a user control interface; a controller that executes control determined by an input via the user control interface; a housing capable of housing a recording medium; and an acquisition interface that acquires housing information related to whether the recording medium is housed in the housing. The controller disenables the input via the user control interface when the housing information acquired by the acquisition interface indicates that the recording medium is housed.

Another embodiment relates to a user control method. The method is adapted to an electronic device including a user control interface; a controller that executes control determined by an input via the user control interface; and a housing capable of housing a recording medium and includes: acquiring housing information related to whether the recording medium is housed in the housing; and disenabling the input via the user control interface when the housing information acquired indicates that the recording medium is housed.

Optional combinations of the aforementioned constituting elements, and implementations of the embodiment in the form of methods, apparatuses, systems, recording mediums, and computer programs, etc. may also be practiced as additional modes of the embodiments.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION

The invention will now be described by reference to the preferred embodiments. This does not intend to limit the scope of the present invention, but to exemplify the invention.

Embodiment 1

A brief summary will be given before describing the invention in specific details. Embodiment 1 relates to an electronic device capable of housing a recording medium and accessing the recording medium. An example of the electronic device is a driver recorder. The electronic device is provided with a user control interface that can be pressed down from outside. When the user control interface is pressed down, the electronic device is shifted to, for example, a device setting mode. Such an electronic device is attached to, for example, the vehicle's a rear window comprised of a rear gate glass, etc. In particular, when the vehicle does not have an independent trunk as in the case of a hatchback car and a wagon car, the electronic device is provided on, for example, a rear gate glass that faces the luggage storage space inside the vehicle. Therefore, the user control interface of the electronic device may be pressed down as a result of the luggage placed in the luggage storage space moving and coming into contact with the electronic device or the luggage placed in the luggage storage space and the electronic device coming into contact with each other when the rear gate is closed.

If the user control interface is pressed down while the electronic device is recording images, a trouble may occur. For example, the electronic device may be shifted to a device setting mode, causing the recording to be suspended. To prevent this, the electronic device according to this embodiment is configured such that a recording medium is removable, and an input via the user control interface is disenabled when the recording medium is housed. When the recording medium is not housed, on the other hand, the electronic device enables an input via the user control interface.

A description will be given of embodiments of the present invention with reference to the drawings. Specific numerical values are shown in the embodiments by way of example only to facilitate the understanding of the invention and should not be construed as limiting the scope of the invention unless specifically indicated as such. Those elements in the specification and drawings that have substantially identical functions and structures are represented by the same reference symbols, and the description is not duplicated. Elements not directly relevant to the invention are omitted from the illustration.

Figure 1:
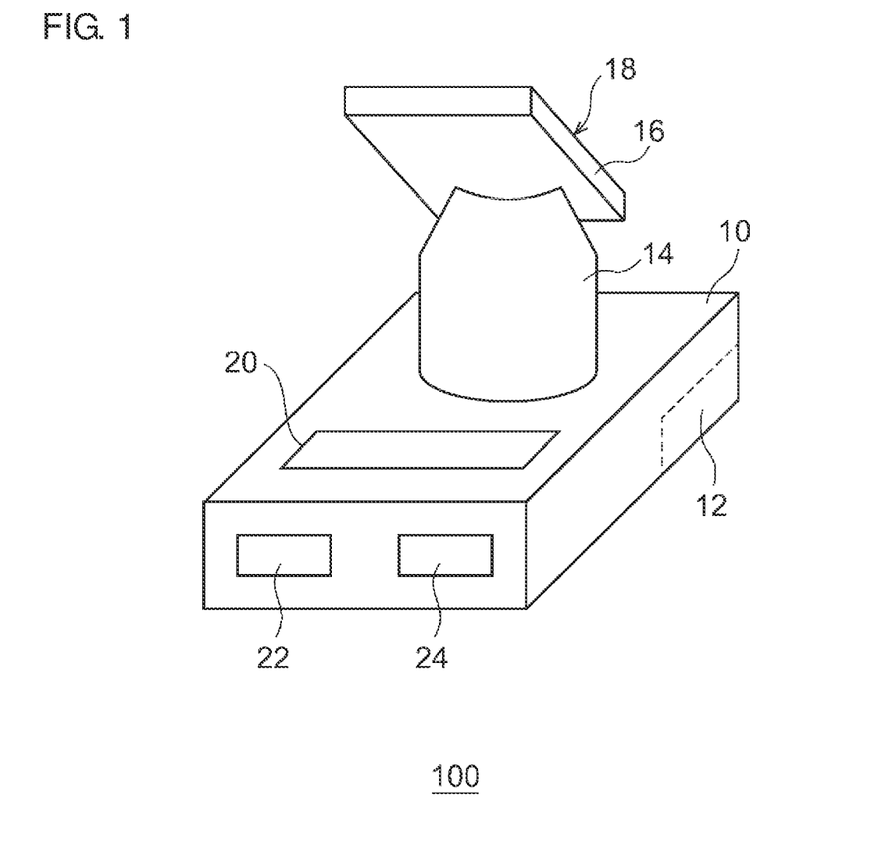
FIG. 1 is a perspective view showing an appearance of an electronic device according to embodiment 1.

FIG. 1 is a perspective view showing an appearance of an electronic device 100. The electronic device 100 includes a casing 10, a support part 14, and a mount 16. The casing 10 includes a housing lid 12, a first user control interface 20, a second user control interface 22, and a third user control interface 24. The mount 16 includes a mount surface 18. The casing 10 has a box shape, and the circuit of the electronic device 100 is built in the casing 10. The housing lid 12 is provided on the side surface of the electronic device 100 along lateral side of the device. The housing lid 12 can be opened or closed. When the housing lid 12 is opened, a recording medium can be inserted into the interior of the casing 10. The recording medium is exemplified by, but not limited to, a secure digital (SD) card. When the recording medium has been inserted into the casing 10, the housing lid 12 is closed.

The first user control interface 20 is provided on the top surface of the casing 10, and the second user control interface 22 and the third user control interface 24 are provided on the front surface of the casing 10. In this embodiment, the front surface is defined in the direction of travel of the vehicle in the case the electronic device 100 is attached to the rear gate glass to image a scene behind the vehicle. The first user control interface 20, the second user control interface 22, and the third user control interface 24 are buttons that can be pressed down. For example, pressing of the first user control interface 20 long may shift the casing 10 to a device setting mode, pressing of the second user control interface 22 down may cause still images to be taken, and pressing of the third user control interface 24 down may add or remove sound to or from moving images. The functions assigned to the inputs via the first user control interface 20, the second user control interface 22, and the third user control interface 24 are not limited to those described. The functions assigned to the inputs via the first user control interface 20, the second user control interface 22, and the third user control interface 24 differ from each other. A lens of an imaging interface (not shown) is provided on the rear surface opposite to the front surface on which the second user control interface 22 and the third user control interface 24 are provided. Further, the first user control interface 20, the second user control interface 22, and the third user control interface 24 may be a resistive film touch panel, a slide switch, a rotary dial, etc. The embodiment is non-limiting as to the form so long as an input operation is possible.

The support part 14 is provided on the top surface of the casing 10. The support part 14 has a columnar shape and extends vertically. The mount 16 is connected to the top end of the support part 14. The mount 16 has a plate shape. The surface opposite to the surface connected to the support part 14 is the mount surface 18. The mount surface 18 is attached to, for example, the rear window of the vehicle. The angle of installation is adjustable in accordance with the angle of inclination of the rear window, which varies from vehicle to vehicle. For attachment to the rear window, a publicly known technology may be used, and a description thereof is omitted. The front surface on which the second user control interface 22 and the third user control interface 24 are provided faces forward in the vehicle, and the rear surface on which the lens of the imaging interface is provided faces rearward in the vehicle. In this way, the casing 10 is supported by the support part 14 extending downward from the mount 16 attached to the vehicle.

Figure 2:
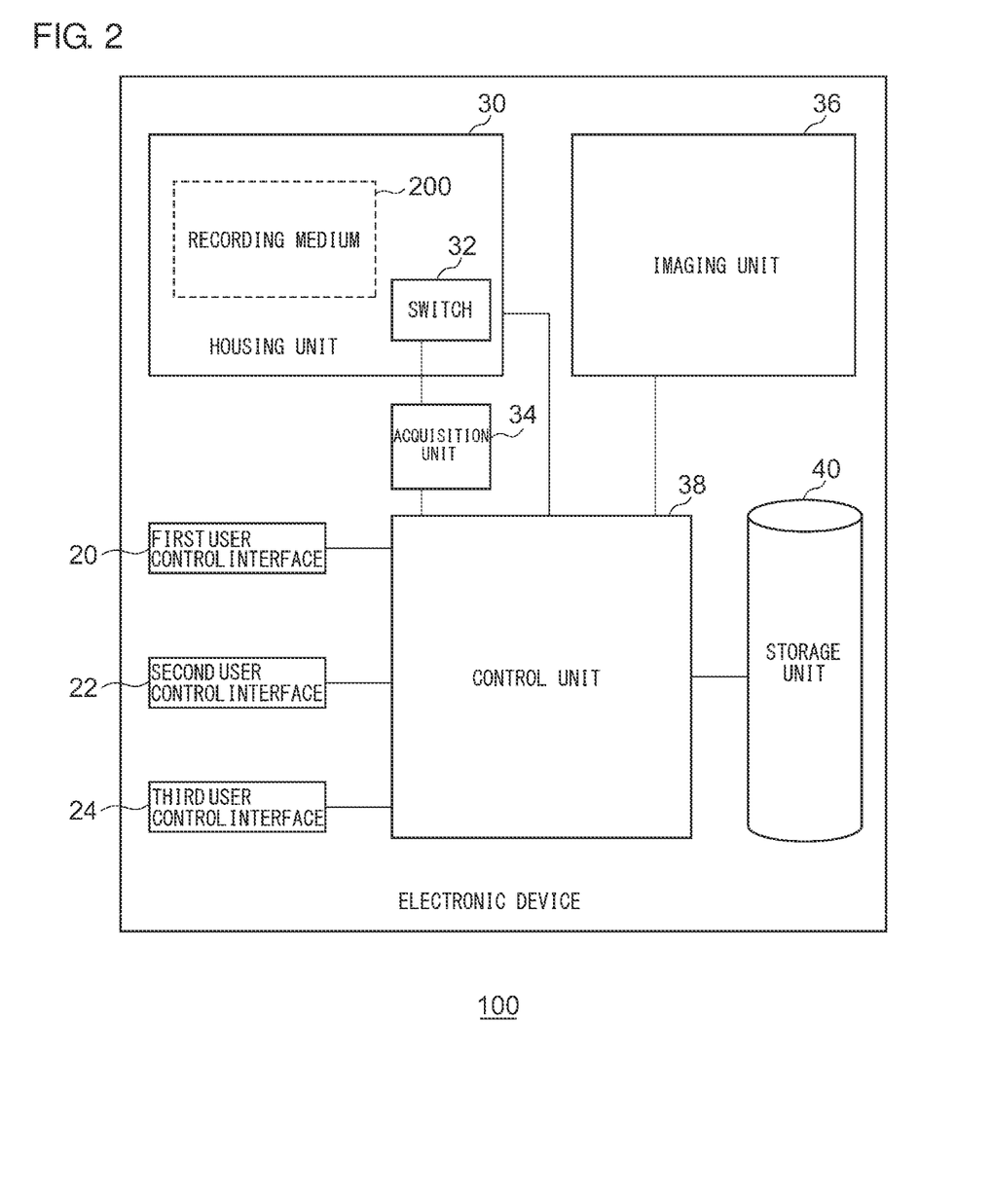
FIG. 2 shows a configuration of the electronic device of FIG. 1.

FIG. 2 shows a configuration of the electronic device 100. The electronic device 100 includes the first user control interface 20, the second user control interface 22, the third user control interface 24, a housing 30, a switch 32, an acquisition interface 34, an imaging interface 36, a controller 38, and a storage 40. The housing 30 is provided at a position exposed when the housing lid 12 of FIG. 1 is open. The housing 30 can house a recording medium 200. By housing the recording medium 200 in the housing 30, the electronic device 100 can access the recording medium 200. The switch 32 is provided inside the housing 30. When the recording medium 200 is housed in the housing 30, the switch 32 is pressed. When the recording medium 200 is not housed in the housing 30, on the other hand, the switch 32 is not pressed. Thus, the switch 32 detects whether the recording medium 200 is housed in the housing 30. The switch 32 outputs housing information related to whether the recording medium 200 is housed in the housing 30 to the acquisition interface 34. The acquisition interface 34 acquires the housing information from the switch 32 and outputs the housing information to the controller 38. The switch 32 may be a physical, mechanical switch as described above. Alternatively, a determination as to whether the recording medium 200 can be accessed may be made by software means.

The imaging interface 36 takes a video showing a scene behind the vehicle. The video is comprised of moving images in which a plurality of still images are continuous. The imaging interface 36 outputs the video taken to the controller 38. The video, still images, and moving images may be digital data. When the housing information acquired from the acquisition interface 34 indicates that the recording medium is housed, the controller 38 records the video received from the imaging interface 36 in the recording medium 200. When the housing information acquired from the acquisition interface 34 indicates that the recording medium is not housed, on the other hand, the controller 38 does not record the video received from the imaging interface 36 in the recording medium 200 or does not cause the imaging interface 36 to take images.

As described above, the first user control interface 20 is a button to shift the electronic device 100 to a device setting mode. For example, an input via the first user control interface 20 is an input to select a device setting mode related to a write process for writing a video in the recording medium 200 and configured to select a resolution, a frame rate, etc. of the video. The input via the first user control interface 20 is not limited to an input to select a device setting mode but may be an input related to the setting of the electronic device 100. The first user control interface 20 outputs the input to the controller 38.

The controller 38 receives the input via the first user control interface 20. When the housing information acquired by the acquisition interface 34 indicates that the recording medium is not housed, the controller 38 executes control determined by the received input. In this case, a transition to a device setting mode is made to enable device setting. The result of device setting is stored in the storage 40. When the housing information acquired by the acquisition interface 34 indicates that the recording medium is housed, on the other hand, the controller 38 disenables the received input. In other words, a transition to a device setting mode is not made, and device setting is disabled in this case. If the recording medium 200 is housed in the housing 30, therefore, a transition to a device setting mode is not made even when the input via the first user control interface 20 is received by the controller 38, and the video taken by the imaging interface 36 continues to be recorded.

The second user control interface 22 and the third user control interface 24 are buttons to receive inputs for functions different from that of the first user control interface 20. As described above, these inputs may cause still images to be taken or add or remove sound to or from moving images. Therefore, the input via the first user control interface 20 can be said to be an input excluding an input to start a write process in the recording medium 200. The second user control interface 22 and the third user control interface 24 output inputs to the controller 38. The controller 38 executes control determined by the input via the second user control interface 22 or the third user control interface 24 regardless of whether the housing information acquired by the acquisition interface 34 indicates that the recording medium is housed or not housed. Alternatively, the controller 38 may only execute control determined by the input in the second user control interface 22 and disenable the input via the third user control interface 24, or only execute control determined by the input via the third user control interface 24. In other words, the controller 38 enables the input via the second user control interface 22 or the third user control interface 24 regardless of the housing information. Stated otherwise, the controller 38 receives the input via the second user control interface 22 or the third user control interface 24 apart from the first user control interface 20.

The features are implemented in hardware such as a CPU, a memory, or other LSIs of an arbitrary computer and in software such as a program loaded into a memory. The figure depicts functional blocks implemented by the cooperation of these elements. Therefore, it will be understood by those skilled in the art that the functional blocks may be implemented in a variety of manners by hardware only, software only, or by a combination of hardware and software.

Figure 3:
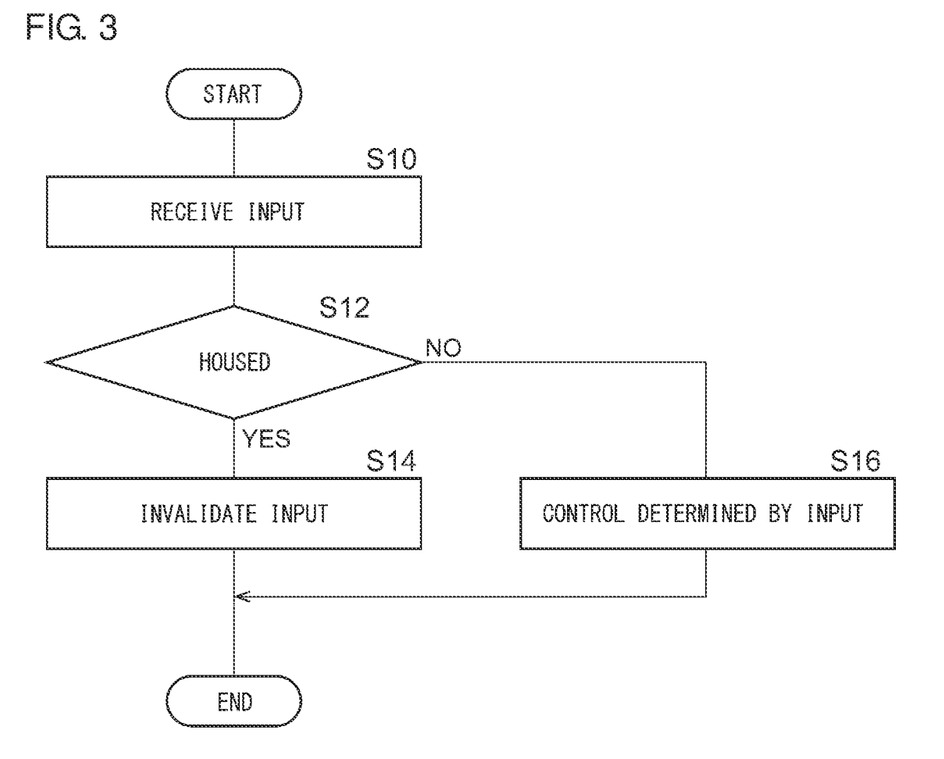
FIG. 3 is a flowchart showing a sequence of steps performed by the electronic device of FIG. 1.

A description will be given of the operation of the electronic device 100 configured as described above. FIG. 3 is a flowchart showing a sequence of steps performed by the electronic device 100. The controller 38 receives an input via the first user control interface 20 (S10). When the recording medium 200 is housed in the housing 30 (YES in S12), the controller 38 disenables the input (S14). When the recording medium 200 is not housed in the housing 30 (NO in S12), the controller 38 executes control determined by the input (S16).

According to this embodiment, the input is disenabled when the recording medium is housed in the housing so that an input generated by a wrong operation is prevented. Further, since the input is enabled when the recording medium is not housed in the housing so that control determined by the input is executed. Further, since the input relates to the setting of the electronic device, transition to a device setting mode is prevented when the recording medium is housed in the housing. Further, since the input is an input excluding an input to start a write process in the recording medium, a write process in the recording medium can be started even when the recording medium is housed in the housing. Further, since the input is an input to select a setting mode related to a write process for writing a video in the recording medium, a setting mode related to a write process is prevented from being selected when the recording medium is housed in the housing. Further, an input via a further user control interface is enabled when the recording medium is housed in the housing, a further input can be executed.

Embodiment 2

A description is given of embodiment 2. Like embodiment 1, embodiment 2 relates to an electronic device capable of housing a recording medium and accessing the recording medium. The electronic device according to embodiment 1 is configured such that a recording medium is removable, and an input via the first user control interface is disenabled when the recording medium is housed. In other words, the recording medium should not be housed in order to enable the input via the first user control interface. In a situation in which the luggage placed in the luggage storage space is unlikely to be moved, on the other hand, controllability is improved by enabling the input via the first user control interface even if the recording medium is housed. The electronic device according to embodiment 2 acquires movement information indicating a moving state or a stopped state and enables the input via the first user control interface even if the recording medium is housed so long as the movement information indicates that the electronic device is at a stop. This is because the luggage is no likely to be moved in a stopped state. According to embodiment 2, malfunctioning caused by the movement of luggage, etc. during the travel of the vehicle is prevented. The electronic device according to embodiment 2 is of the same type as that of FIG. 1. The description below highlights a difference from embodiment 1.

Figure 4:
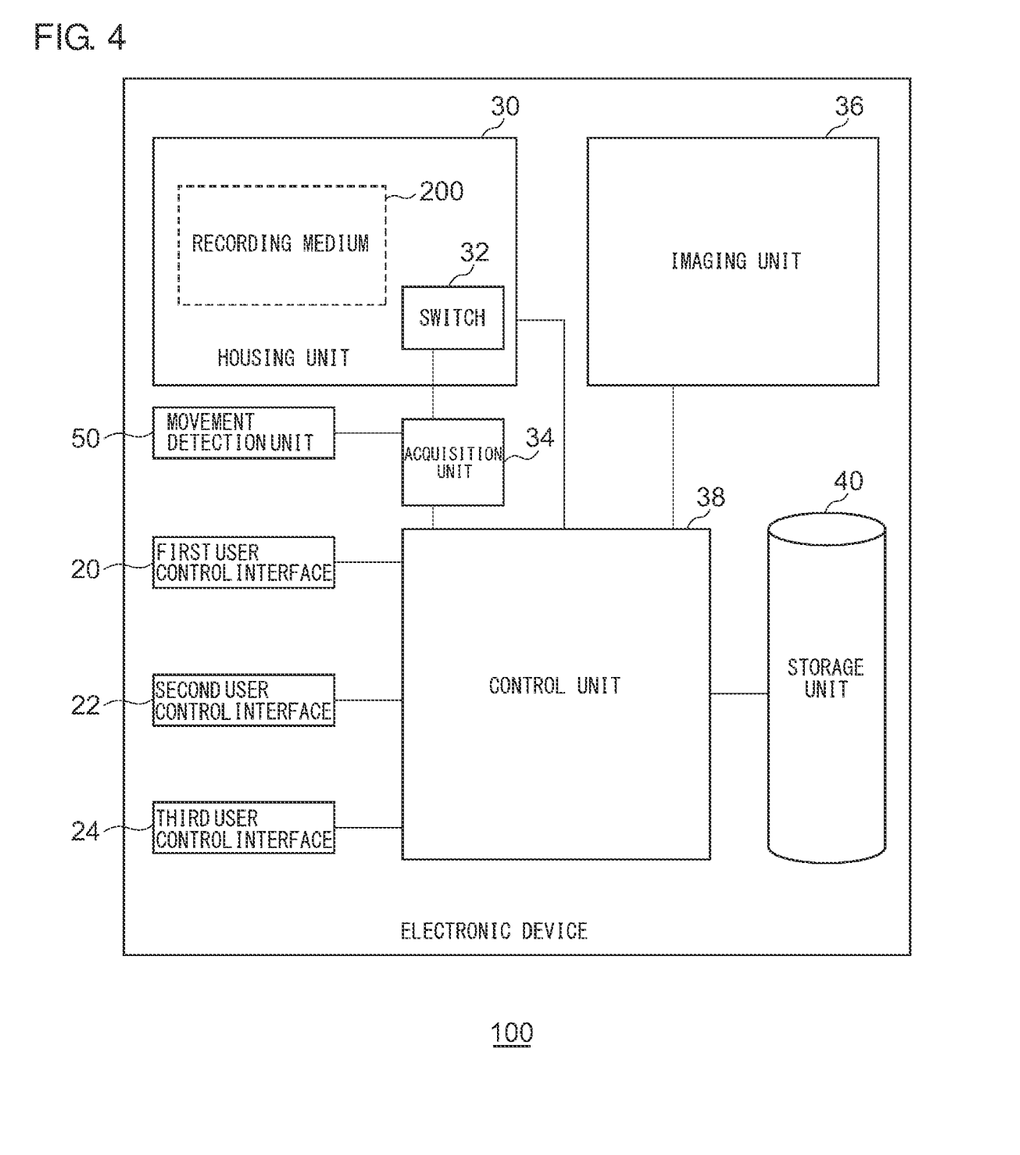
FIG. 4 shows a configuration of the electronic device according to embodiment 2.

FIG. 4 shows a configuration of the electronic device 100. In addition to the features of FIG. 2, the electronic device 100 includes a movement detector 50. The movement detector 50 detects whether the vehicle carrying the electronic device 100 is moving or at a stop. For example, the movement detector 50 has a function of receiving a Global Navigation Satellite Systems (GLASS) signal, detects positional information on the vehicle, and derives the traveling speed of the vehicle based on the temporal change in the positional information. When the traveling speed is larger than a movement determination threshold value, the movement detector 50 determines that the vehicle is moving. When the traveling speed is equal to or smaller than the movement determination threshold value, the movement detector 50 determines that the vehicle is at a stop.

Further, the movement detector 50 may include an acceleration sensor and detect whether the vehicle is moving or at a sop by referring to the result of detection by the acceleration sensor. Further, the movement detector 50 may be connected to a Control Area Network (CAN) and detect whether the vehicle is moving or at a stop by referring to a signal received via the CAN and related to the traveling speed, gear position, ON/OFF of the engine of the vehicle. The movement detector 50 outputs movement information related to whether the vehicle or the electronic device 100 is moving or at a stop to the acquisition interface 34.

The acquisition interface 34 acquires the movement information from the acquisition interface 34 and outputs the movement information to the controller 38. The controller 38 receives the input via the first user control interface 20.

When the housing information acquired by the acquisition interface 34 indicates that the recording medium is not housed, the controller 38 continues to execute control determined by the input received. When the housing information acquired by the acquisition interface 34 indicates that the recording medium is housed and the movement information acquired by the acquisition interface 34 indicates that the vehicle or the electronic device is at a stop, the controller 38 enables the input via the first user control interface 20. In this case, the same process as performed when the housing information acquired by the acquisition interface 34 indicates that the recording medium is not housed is performed. When the housing information acquired by the acquisition interface 34 indicates that the recording medium is housed and the movement information acquired by the acquisition interface 34 indicates that the vehicle or the electronic device is moving, on the other hand, the controller 38 disenables the input via the first user control interface 20.

Figure 5:
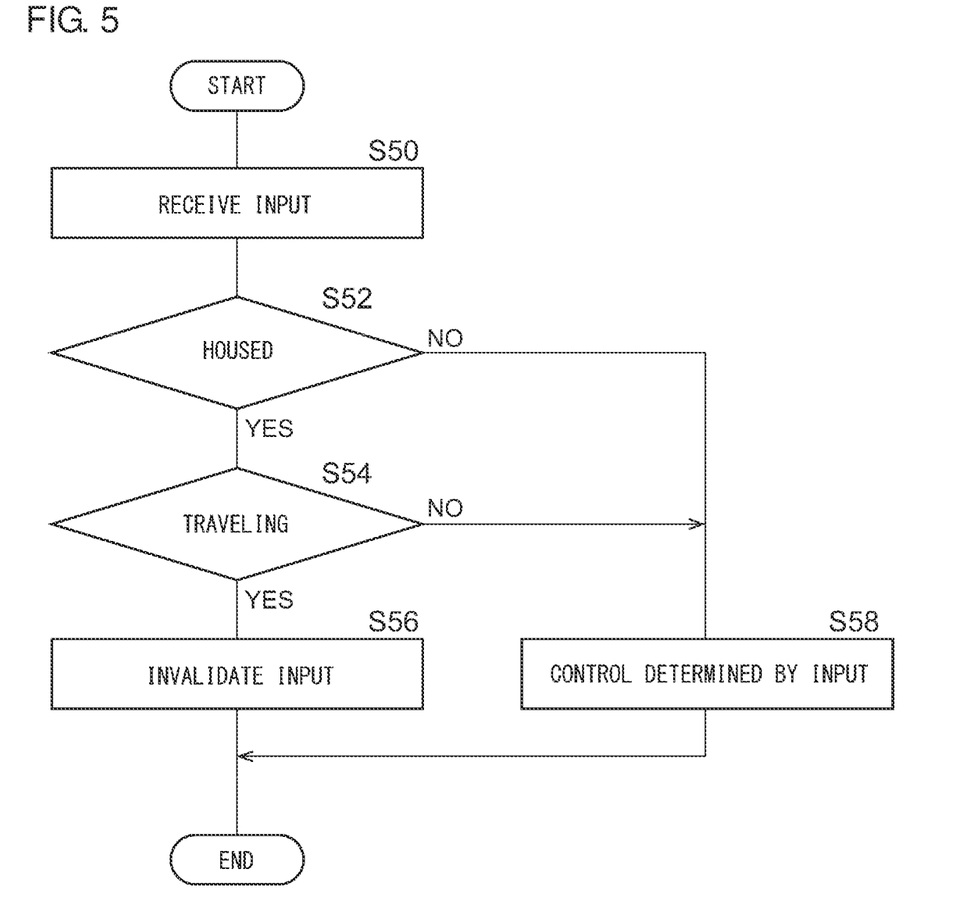
FIG. 5 is a flowchart showing a sequence of steps performed by the electronic device of FIG. 4.

A description will be given of the operation of the electronic device 100 configured as described above. FIG. 5 is a flowchart showing a sequence of steps performed by the electronic device 100. The controller 38 receives an input via the first user control interface 20 (S50). When the recording medium 200 is housed in the housing 30 (YES in S52) and the electronic device 100 is traveling (YES in S54), the controller 38 disenables the input (S56). When the recording medium 200 is not housed in the housing 30 (NO in S52) or the electronic device 100 is not traveling (NO in S54), the controller 38 executes control determined by the input (S58).

According to this embodiment, the input is disenabled when the recording medium is housed in the housing and the vehicle or the electronic device is moving so that an input generated by a wrong operation is prevented. Further, the input is enabled when the vehicle or the electronic device is at a stop even if the recording medium is housed in the housing. Accordingly, controllability is improved.

Embodiment 3

A description is given of embodiment 3. Like the foregoing embodiments, embodiment 3 relates to an electronic device capable of housing a recording medium and accessing the recording medium. Embodiment 3 is directed to a purpose of further improving the precision of user control as compared with embodiment 2. The electronic device according to embodiment 3 measures a period of time elapsed since the electronic device is started. When the moving information indicates that the vehicle or the electronic device is at a stop and the period of time elapsed since the start-up is short, the electronic device enables the input via the first user control interface even if the recording medium is housed. This is because the setting is often performed in a short period of time since the start-up. When the period of time since the start-up is long, on the other hand, it may include a case in which the vehicle has been traveling and has come to a stop, and, in this case, the luggage could be moved as the vehicle comes to a stop, thereby pressing the first user control interface down. According to embodiment 3, malfunctioning caused by the movement of the luggage, etc. occurring as the traveling vehicle comes to a stop is prevented. The electronic device according to embodiment 3 is of the same type as that of FIG. 1. The description below highlights a difference from the foregoing embodiments.

Figure 6:
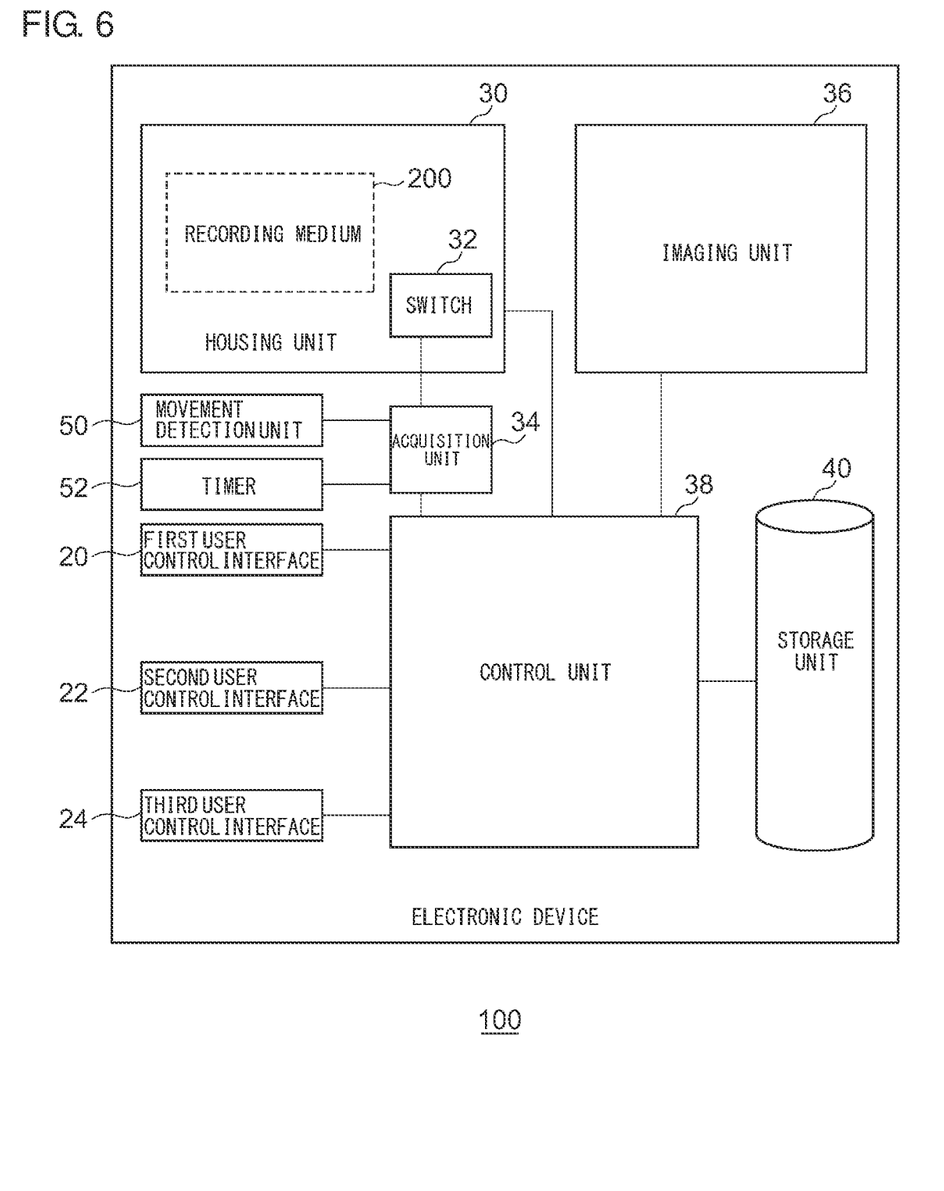
FIG. 6 shows a configuration of the electronic device according to embodiment 3.

FIG. 6 shows a configuration of the electronic device 100. In addition to the features of FIG. 4, the electronic device 100 includes a timer 52. The timer 52 measures a period of time elapsed since the electronic device 100 is started. An upper limit value is defined for the measurable period of time, and the timer 52 may terminate the measurement when the upper limit value is reached. The timer 52 outputs the measured period of time to the acquisition interface 34. The acquisition interface 34 acquires the period of time from the acquisition interface 34 and outputs the period of time to the controller 38.

The controller 38 receives an input via the first user control interface 20. When the housing information acquired by the acquisition interface 34 indicates that the recording medium is not housed, the controller 38 continues to execute control determined by the input received. When the housing information acquired by the acquisition interface 34 indicates that the recording medium is housed and the movement information acquired by the acquisition interface 34 indicates that the vehicle or the electronic device is at a stop, the controller 38 enables the input via the first user control interface 20 provided that the period of time elapsed since the electronic device 100 is started is equal to or less than a threshold value. In this case, the same process as performed when the housing information acquired by the acquisition interface 34 indicates that the recording medium is not housed is performed. When the housing information acquired by the acquisition interface 34 indicates that the recording medium is housed and the movement information acquired by the acquisition interface 34 indicates that the vehicle or the electronic device is at a stop, on the other hand, the controller 38 disenables the input via the first user control interface 20 provided that the period of time elapsed since the electronic device 100 is started is longer than the threshold value.

Figure 7:
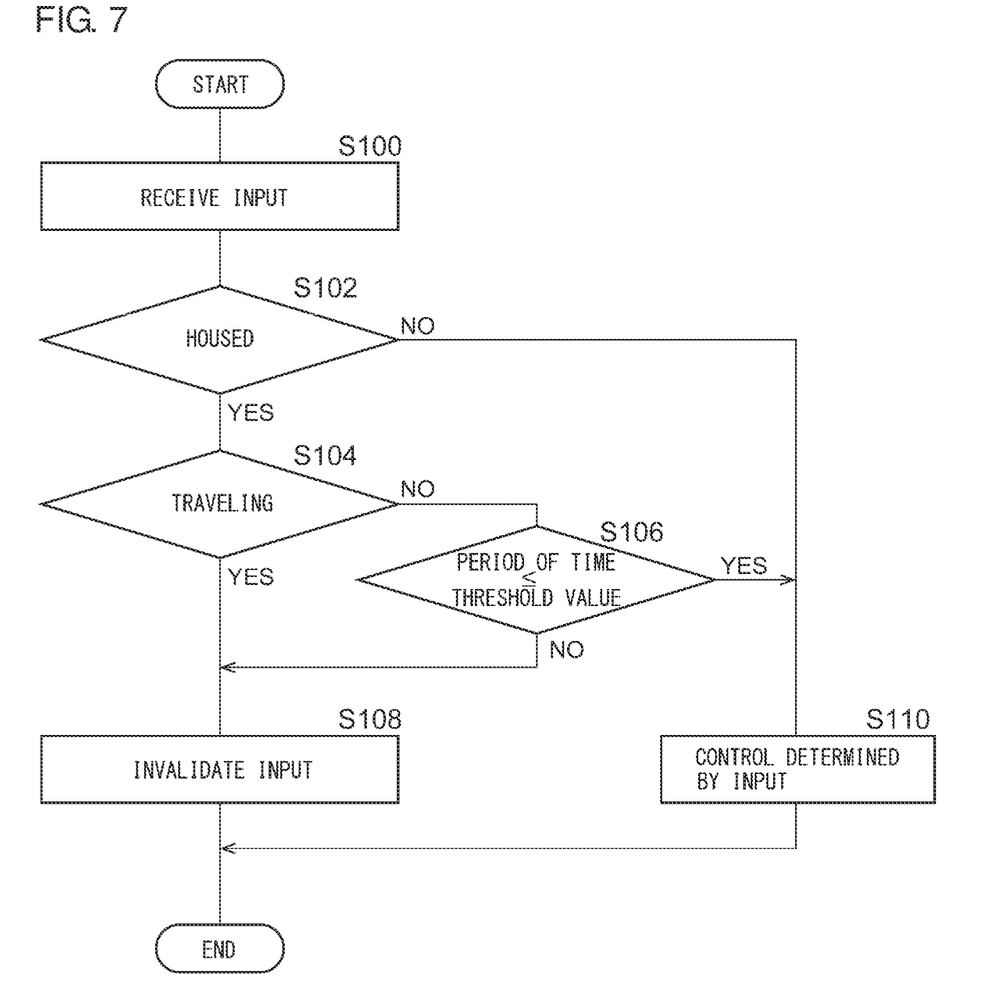
FIG. 7 is a flowchart showing a sequence of steps performed by the electronic device of FIG. 6.

A description will be given of the operation of the electronic device 100 configured as described above. FIG. 7 is a flowchart showing a sequence of steps performed by the electronic device 100. The controller 38 receives an input via the first user control interface 20 (S100). When the recording medium 200 is housed in the housing 30 (YES in S102) and the electronic device 100 is traveling (YES in S104), the controller 38 disenables the input (S108). When the electronic device 100 is not traveling (NO in S104), and when the period of time is not equal to or less than the threshold value (NO in S106), the controller 38 disenables the input (S108). When the recording medium 200 is not housed in the housing 30 (NO in S102) or the when the period of time is longer than the threshold value (YES in S106), the controller 38 executes control determined by the input (S110).

According to this embodiment, the input is enabled provided that the period of time since the electronic device is started is equal to or less than a threshold value when the recording medium is housed in the housing and vehicle or the electronic device is at a stop. Therefore, control can be input during a predetermined period of time since the start-up. In further accordance with this embodiment, the input is disenabled provided that the period of time since the electronic device is started is longer than the threshold value when the recording medium is housed in the housing and the vehicle or the electronic device is at a stop.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In embodiments 1 through 3, the input via the first user control interface 20 is an input related to selection of a device setting mode. Alternatively, the input via the first user control interface 20 may be an input of a different type. More specifically, the input may be an input to stop a write process in the recording medium 200. According to this variation, the flexibility in the configuration is improved.

In embodiments 1 through 3, the electronic device 100 performs a write process in the recording medium 200. Alternatively, the electronic device 100 may perform a read process for reading from the recording medium 200. According to this variation, the flexibility in the configuration is improved.

In embodiments 1 through 3, the electronic device 100 is mounted on a vehicle. Alternatively, the electronic device 100 may not be mounted on a vehicle. This variation improves the flexibility in the configuration in the case it is desired to restrict third party control on an electronic device that accesses a recording medium such as a digital camera or a disk medium player.

In embodiments 1 through 3, the electronic device 100 is provided with a housing capable of housing a recording medium. Alternatively, the electronic device 100 may be provided with a communication interface or an input/output interface and may perform a write process or a read process in a storage provided in an external server, or a communication terminal, or a storage device. In this embodiment, the controller executes control to disenable or enable an input via the user control interface based on connection information indicating whether it is possible to access the storage, instead of the housing information indicating whether the recording medium 200 is housed in embodiments 1 through 3. According to this variation, the flexibility in the configuration is improved.

Described above is an explanation based on the exemplary embodiments of the present invention. These exemplary embodiments are intended to be illustrative only, and it will be obvious to those skilled in the art that various modifications to constituting elements and processes could be developed and that such modifications are also within the scope of the present invention.

What is claimed is:

1. An electronic device comprising:
a user control interface-;
a controller that executes control determined by an input via the user control interface;
a housing capable of housing a recording medium;
a movement detector that detects movement information related to whether the electronic device is moving or at a stop; and
an acquisition interface that acquires housing information related to whether the recording medium is housed or not housed in the housing and acquires the movement information from the movement detector, wherein
the controller disenables the input via the user control interface when the housing information acquired by the acquisition interface indicates that the recording medium is housed and the movement information acquired by the acquisition interface indicates that the electronic device is moving, enables the input via the user control interface when the housing information acquired by the acquisition interface indicates that the recording medium is housed and the movement information acquired by the acquisition interface indicates that the electronic device is at a stop, and enables the input via the user control interface when the acquisition interface indicates that the recording medium is not housed.

2. The electronic device according to claim 1, wherein when the housing information acquired by the acquisition interface indicates that the recording medium is housed and the movement information acquired by the acquisition interface indicates that the electronic device is at a stop, the controller enables the input via the user control interface provided that a period of time elapsed since the electronic device is started is equal to or less than a threshold value and disenables the input via the user control interface provided that a period of time elapsed since the electronic device is started is longer than the threshold value.

3. The electronic device according to claim 1, wherein the input via the user control interface is an input related to setting of the electronic device.

4. The electronic device according to claim 1, wherein the input via the user control interface is an input excluding an input to start a write process in the recording medium.

5. The electronic device according to claim 4, wherein the input via the user control interface is an input to stop a write process in the recording medium.

6. The electronic device according to claim 1, further comprising:
an imaging interface that takes a video, wherein
the input via the user control interface is an input to select a setting mode related to a write process for writing a video in the recording medium.

7. The electronic device according to claim 1, further comprising:
a further user control interface different from the user control interface, wherein
the controller also executes control determined by an input via the further user control interface, and
the controller enables the input via the further user control interface when the housing information acquired by the acquisition interface indicates that the recording medium is housed.

8. A user control method adapted to an electronic device including a user control interface; a controller that executes control determined by an input via the user control interface; and a housing capable of housing a recording medium, the method comprising:
acquiring housing information related to whether the recording medium is housed or not housed in the housing;
detecting movement information related to whether the electronic device is moving or at a stop; and
disenabling the input via the user control interface when the housing information indicates that the recording medium is housed and the movement information indicates that the electronic device is moving, enabling the input via the user control interface when the housing information indicates that the recording medium is housed and the movement information indicates that the electronic device is at a stop, and enabling the input via the user control interface when the housing information indicates that the recording medium is not housed.

9. A non-transitory computer readable recording medium encoded with a computer program adapted to an electronic device including a user control interface; a controller that executes control determined by an input via the user control interface; and a housing capable of housing the recording medium, the program in response to execution, causes the electronic device to perform operations comprising:

acquiring housing information related to whether the recording medium is housed or not housed in the housing;

detecting movement information related to whether the electronic device is moving or at a stop; and disenabling the input via the user control interface when the housing information indicates that the recording medium is housed and the movement information indicates that the electronic device is moving, enables the input via the user control interface when the housing information indicates that the recording medium is housed and the movement information indicates that the electronic device is at a stop, and enabling the input via the user control interface when the housing information indicates that the recording medium is not housed.

* * * * *